United States Patent [19]

Kammiller

[11] Patent Number: 4,761,727
[45] Date of Patent: Aug. 2, 1988

[54] CURRENT SENSING CIRCUIT FOR USE WITH DECOUPLED HALF BRIDGE CONVERTER

[75] Inventor: Neil Kammiller, Lakewood, Ohio

[73] Assignee: Reliance Comm/Tec Corporation, Chicago, Ill.

[21] Appl. No.: 140,874

[22] Filed: Jan. 6, 1988

Related U.S. Application Data

[62] Division of Ser. No. 37,984, Apr. 14, 1987, abandoned.

[51] Int. Cl.⁴ .......................................... H02M 7/5387
[52] U.S. Cl. ...................................... 363/98; 323/358; 323/361; 363/17; 363/126
[58] Field of Search .................. 363/16, 17, 27, 28, 363/98, 126, 132; 323/358, 361; 361/93

[56] References Cited

U.S. PATENT DOCUMENTS

| | | | |
|---|---|---|---|
| 3,573,597 | 4/1971 | Genoit et al. | 363/28 |
| 3,714,545 | 1/1973 | Chiffert | 323/358 |
| 3,733,538 | 5/1973 | Kernick et al. | 361/93 |
| 3,816,810 | 6/1974 | Friedman et al. | 363/28 |
| 4,586,119 | 4/1986 | Sutton | 363/17 |
| 4,648,017 | 3/1987 | Nerone | 363/80 |
| 4,685,039 | 8/1987 | Inou et al. | 363/16 |
| 4,691,273 | 9/1987 | Kunata et al. | 363/17 |

FOREIGN PATENT DOCUMENTS 1065997  1/1984  U.S.S.R. ............................. 363/17

Primary Examiner—William H. Beha, Jr.
Attorney, Agent, or Firm—Michael M. Rickin

[57] ABSTRACT

A high power half bridge converter which uses FETs. Each of the FETs has its own power transformer. This results in a decoupled series half bridge configuration which minimizes the generation of undesirable spurious r.f. signals. Current sensing circuits for use with the decoupled series half bridge configuration are also disclosed. Each current sensing circuit uses cascaded current sensing transformers each of which has an associated circuit for resetting the transformer. In this manner a sample of the resonant current is obtained which is identical to the original except for being reduced in amplitude and d-c level.

14 Claims, 3 Drawing Sheets

CURRENT SENSING CIRCUIT FOR USE WITH DECOUPLED HALF BRIDGE CONVERTER

This is a divisonal of co-pending application Ser. No. 037,984 filed on Apr. 14, 1987, now abandoned.

BACKGROUND OF THE INVENTION

This invention relates to the art of power supplies and, more particularly, to a circuit for use in a high power half bridge converter which uses field effect transistors (FETs).

Power converters are known in the art and typically serve to accept energy from an unregulated energy source, such as a voltage source, and derive therefrom a regulated, isolated voltage which is applied to a load circuit. The regulation function is performed by interposing a regulating device between the source of energy and the load circuit.

One form of regulating device known in the prior art includes switching type regulating devices interposed between the source of energy and the load. These operate in a discontinuous manner in controlling the rate of energy transmission and, hence, consume less power during the regulating operation than regulating devices of the variable impedance type. The switching device has two modes of operation, fully on and fully off. The switching device is periodically turned on for a time interval to permit energy transfer for purposes of maintaining the power output at a predetermined level.

Typically, such switching type regulating devices employed in power converters utilize semiconductor devices, such as power transistors, as the switching devices. These devices are turned fully on, or saturated, or fully off during operation. When fully on, the semiconductor devices are conducting and little or no power is dissipated. Also, when nonconducting or fully off no power is dissipated therein. Power is, however, dissipated in such a semiconductor device during the time interval of switching from a nonconducting condition to a conducting condition and vice versa. It is during the switching time interval that a substantial amount of power may be dissipated in such a semiconductor device, and if large enough this may severely damage the semi-conductor device.

It is desirable to provide power converters of the switching type which are cost effective and which occupy a small amount of space. This, then, necessitates high frequency operation, such as in excess of 20 KH$_z$ and preferably at substantially higher frequencies, such as 250 KH$_z$, while transferring large amounts of power, such as on the order of several thousand watts or more. In order to achieve such high frequency operation of power switches, sinusoidal operation in the form of a series resonant converter has been employed as opposed to the squarewave operation typically employed in the prior art.

One such example of a series resonant converter including a control circuit therefor is shown in U.S. Pat. No. 4,648,017 entitled "Control Of A Series Resonant Converter" which issued on Mar. 3, 1987 and is assigned to the same assignee as is the present invention (hereinafter the '017 patent). As described in the '017 patent, the converter uses a series half bridge arrangement having a single power transformer for the power switches. As described in more detail hereinafter that configuration may give rise to spurious radio frequency signals which may either interfere with the operation of the supply or radiate outside of the supply to surrounding equipment. It is desirable to minimize those signals.

As described in the '017 patent, the control circuit therein initiates the turning off of the on FET only when the resonant current becomes zero. A sample of the resonant current is provided as an input to the control circuit. That sample must contain therein the information relating to the going to zero of the resonant current. As described in more detail hereinafter, the conventional techniques for sensing resonant current do not, under certain circumstances, provide a sample which contains that needed information.

SUMMARY OF THE INVENTION

A decoupled half bridge converter circuit for high power applications. The circuit has first and second switch means, each of which have first and second electrodes and a control electrode. An unregulated source of voltage has first and second terminals. The first electrode of the first switch is connected to the first terminal. The second electrode of the second switch is connected to the second terminal. The control electrodes of both switches receive signals for actuating the switches on at a controlled rate with only one of the switches being on at any one time.

The circuit also includes first and second power transformers. The primary winding of the first power transformer has one end directly connected to the second electrode of the first switch. The other end of that winding is connected to the first electrode of the first switch by a first circuit. The primary winding of the second power transformer is connected directly at one end to the first electrode of the second switch. The other end is connected to the second electrode of the second switch by a second circuit.

A circuit for sensing the resonant current flowing in the decoupled half bridge converter circuit is also included. The sensing circuit provides at its output a signal which is substantially identical in all respects to the resonant current signal except for being reduced in amplitude and d-c level therefrom by a predetermined amount. The circuit has first and second current sensing transformers. The resonant current flows through the primary winding of the first current sensing transformer. A first circuit is connected between the first current sensing transformer secondary winding and the second current sensing transformer primary winding. The circuit provides for resetting of the first current sensing transformer so that an accurate current signal can flow through the primary winding of the second current sensing transformer.

A second circuit is connected between the secondary winding of the second current sensing transformer and the output of the circuit. The second circuit is for resetting the second current sensing transformer. The product of the turns ratios of the two current sensing transformers determines the amount by which the resonant current signal at the output is reduced in amplitude and d-c level from the sensed resonant current.

DESCRIPTION OF THE PREFERRED EMBODIMENT

Figure 1:
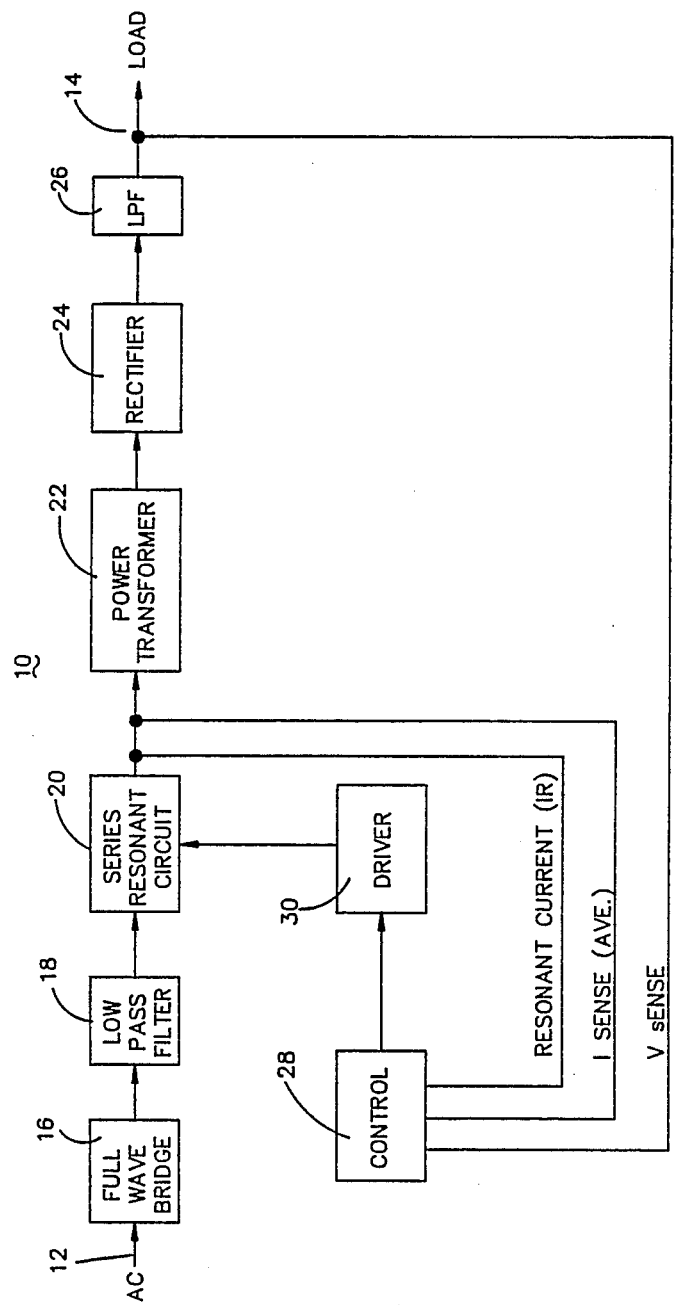
FIG. 1 is a block diagram illustrating a typical power supply of the series resonant type in which the present invention may be used.

Reference is now made to the drawings wherein the showings are for purposes of illustrating a preferred embodiment only. Referring now to FIG. 1, there is shown a block diagram of a high frequency power supply 10 which converts an AC voltage at its input 12 to a regulated DC voltage at its output 14. FIG. 1 in this application is identical to FIG. 1 of the aforementioned '017 patent. This voltage conversion is achieved by first rectifying the AC voltage by means of a full wave bridge rectifier 16 and this rectified voltage is then filtered by a low-pass filter (LPF) 18 providing at the output of the filter an unregulated DC voltage.

Supply 10 includes a series resonant power circuit 20 which receives the unregulated DC voltage from the low-pass filter 18 and provides the regulated and isolated DC voltage at output terminals 14. As will be discussed in greater detail hereinafter, the circuit 20 includes a pair of power switches, preferably FETs, which are arranged in a series half bridge configuration. These are alternately turned fully on and fully off through the use of a pulse position modulation (PPM) technique. In this technique, for stable input and output conditions pulses of constant width are applied to the gate electrodes of the FETs to turn them on for a fixed duration. It is the frequency at which these pulses are applied to the FETs that determines the transfer of power and which is controlled in accordance with the invention herein. The series resonant circuit includes the primary winding of the power transformer 22 and the secondary winding is coupled to the output by means of a rectifier 24 and a low-pass filter 26.

The switching of the FETs and therefore the operation of supply 10 is generally controlled as a function of either the voltage present at the output terminal 14 or the average current flowing in the primary winding of the power transformer 22. Ordinarily, the supply 10 operates in a voltage controlled mode to provide regulated DC voltage at output 14. As the load varies, the switching of the FETs is controlled to maintain the regulated output.

In addition to regulation based on loading, control 28 also responds to the average current flowing in the series resonant circuit. Consequently, the rate at which current pulses are applied through the power switches and, hence, the series resonant converter circuit is controlled to limit the magnitude of the average current and thereby prevent damage to sensitive power components such as FETs and rectifiers.

Additionally, as will be brought out in detail herein, the current pulses flowing through the series resonant circuit 20 are supplied at a frequency dependent upon the magnitude of the series resonant current flowing therethrough. It is these three input, output voltage, average current and resonant current that are supplied to the control 28 which, in turn, operates a driver circuit 30 to control the switching of the FETs in the series resonant converter.

Figure 2:
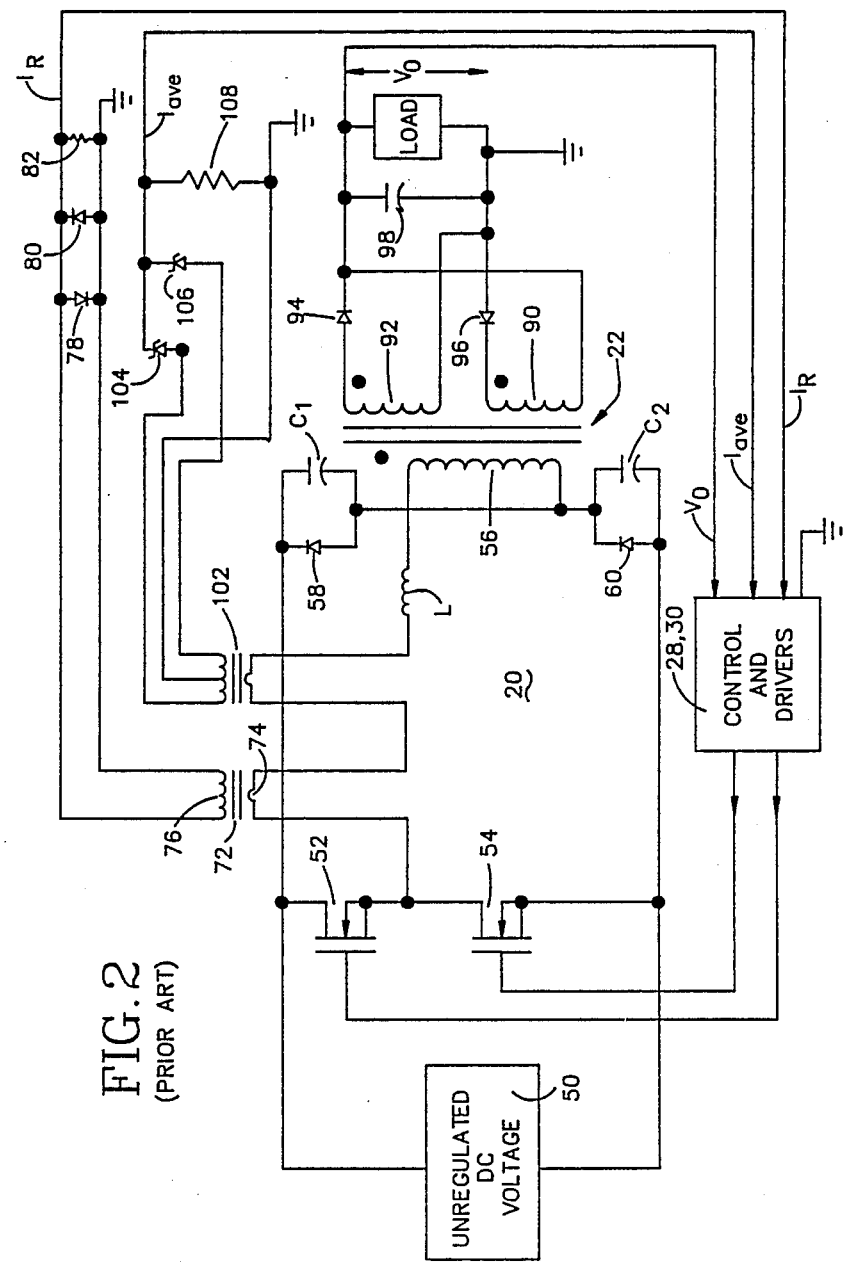
FIG. 2 is a schematic-block diagram illustration of a prior art resonant converter and control therefor for the power supply shown in FIG. 1.

Having briefly described the operation of a power supply in conjunction with FIG. 1, attention is now directed to FIG. 2, which illustrates a typical prior art embodiment for the series resonant circuit 20 and the power transformer 22 in somewhat greater detail. FIG. 2 herein is substantially identical to FIG. 2 of the aforementioned '017 patent. The input to the circuit 20 is shown in FIG. 2 as being an unregulated DC voltage 50 which is representative of the output of the low-pass filter 18 in FIG. 1. The circuit 20 includes a pair of field effect transistors 52 and 54 arranged in the well known series half bridge configuration. The FETs are alternately gated into conduction, or fully on, by the converter control 28. Whenever one of the field effect transistors is turned on, it completes a path for current to flow from the voltage source 50 through a series resonant circuit including the primary winding 56 of the single power transformer 22 and a series inductor L together with one of two capacitors $C_1$ and $C_2$. Diodes 58 and 60 connected in parallel with capacitors $C_1$ and $C_2$, respectively, constrain the voltage excursions across these capacitors, thereby stabilizing the resonant tank circuit. The inductor L may be present in fact or it may represent the leakage reactance of the transformer.

In operation, as control 28 turns on one of the FETs 52 and 54, a current pulse flows through the resonant circuit. Each pulse has a rise time and fall time dependent on the components in the resonant tank circuit and appears in the form of a sinusoidal pulse. At steady state conditions, these pulses will be uniformly sinusoidal in shape and have a fixed width and a fixed peak value. At low power, or low loading conditions, the current pulses occur at a low frequency of operation of the FETs 52 and 54. As demand increases for higher power operation, these pulses occur at a greater frequency. To achieve operation without the FETs 52 and 54 being on at the same time, then the frequency of supplying the current pulses must be held to be somewhat less than that of a maximum resonant frequency $F_M$ which is determined by the components of the resonant tank circuit. Consequently, an off time between sinusoidal pulses may be substantial at low power requirements, but quite short during high power requirements. The minimum off time is also known as the dead time.

The switching on (or off) of such power switches can be accomplished during periods of no current flowing in the resonant circuit in less time than setting an arbitrary value for the dead time interval. Instead, a determination can be made as to whether current is actually flowing in the resonant circuit and, if it is not, then one power switch can be turned off and the other turned on without dissipating power across a power switch. This is achieved by the control circuitry to be described herein.

During some loading conditions, such as a short circuit of the output, the current pulse will have a trailing edge such that substantial current will still be flowing through the resonant circuit when the power switches are actuated, i.e., one turned off and the other turned on. Energy will be dissipated at the power switches, which may result in component failure. As described in the '017 patent, the control 28 includes circuitry to ensure that the resonant current flow is at essentially a zero level before allowing the on switch to be turned off.

The resonant current $I_R$ flowing in the resonant circuit is sensed with a current sensing transformer 72 having primary winding 74 connected in the series resonant circuit and a secondary winding 76 connected to a wave shaping circuit. The wave shaping circuit includes a pair of oppositely poled clipping diodes 78 and 80 so as to develop a voltage across a resistor 82 representative of a processed or peak clipped current. This voltage is representative of the resonant current $I_R$ and is supplied as one input to the control 28.

In addition to sensing and processing the resonant current for use in controlling the switching of power switches 52 and 54, the control 28 also senses the average current $I_{AVE}$, as well as the output voltage $V_O$ for use in controlling the frequency of operation of the power switches. The output voltage $V_O$ is taken across the load which is on the secondary side of the power transformer 22. This power transformer 22 has secondary rectification taken from a pair of secondary windings 90 and 92, poled as shown, and interconnected with diodes 94 and 96 to maintain a constant charge across a capacitor 98 for supplying the load. The output voltage is taken across the load and is supplied to the control 28. As the load requirements increase because of a loading effect, the frequency of the current pulses in the resonant circuit will be increased.

Control 28 also monitors the average current flowing in the resonant circuit. If the average current is considered too high for proper usage of the FETs, then the frequency of supplying current pulses through the resonant circuit will be decreased to prevent destruction of the FETs. The average current may be sensed as with a current transformer 102 having a primary winding in series with the resonant circuit and its center tapped secondary winding connected to a rectifier circuit made up of Schottky diodes 104 and 106. A voltage representative of the average current $I_{AVE}$ may be developed across an output resistor 108. This voltage is supplied to the control 28. An embodiment for control 28 and driver circuit 30 is shown and described in the '017 patent.

As shown in FIG. 2, the FETs 52, 54, single power transformer 56 and capacitors $C_1$ and $C_2$ are arranged in the series half bridge configuration. Those skilled in the art have recognized this configuration to be a preformed arrangement for a series resonant converter.

The prior art series half bridge configuration shown in FIG. 2 functions quite effectively where the supply 10 is designed to provide moderate output power, for example, in the order of 2 KW. Where, however, a series resonant supply must be designed to provide high output power (hereinafter referred to as a high power converter), for example, 10 KW, the prior art series half bridge configuration does not function that effectively. I have found that the use of the prior art series half bridge configuration in a high power converter results in the generation of substantial spurious radio frequency signals which may either interfere with the operation of supply 10 or radiate outside of the supply to surrounding equipment.

In such high power converters the single FETs 52 and 54 shown in FIG. 2 are each replaced by a multiplicity of FETs connected in parallel. Use of such a multiplicity of FETs connected in parallel may give rise to problems associated with the stray inductance and resistance of the FETs and their unequal delay and fall times. The paralleled FETs can be arranged as shown in my U.S. Pat. No. 4,548,595 to minimize those problems. This arrangement does, however, cause the paralleled FETs to occupy a relatively large physical area. As described below, it is this large physical area which substantially contributes to the generation of spurious radio frequency signals in a high power converter using the prior art series half bridge configuration.

While not shown in FIG. 2, each of the FETs 52, 54 have associated internal capacitances. In particular, it is the internal capacitance from the drain (D) to source (S) of each FET which contributes significantly to the problem described above. In the high power converter using the prior art series half bridge configuration, the paralleled multiplicity of FETs which are being turned on have to move charge in their own source to drain capacitance as well as the source to drain capacitance of each of the other paralleled multiplicity of FETs. With their own source to drain capacitances the going on paralleled multiplicity of FETs forms a relatively small physical loop whereas with the source to drain capacitances of the other paralleled multiplicity of FETs it forms a relatively large physical loop. In a high power converter using the series half bridge configuration this large loop results in the generation of the interfering spurious radio frequency signals when one of the paralleled multiplicity of FETs is undergoing turn-on. Thus, in a high power converter the need to use a multiplicity of paralleled FETs in combination with the prior art series half bridge configuration substantially contributes to the generation of spurious radio frequency signals.

In the prior art series half bridge configuration the charge in the source to drain capacitance of each of the nonturning on paralleled multiplicity of FETs is moved through the turning on paralleled multiplicity of FETs. As is well known, a FET which is being turned on is essentially a resistive impedance. Therefore, that charge will be dissipated, i.e., it cannot be recovered. Recovery of some or all of that charge would probably give rise to an increase in the efficiency of the high power converter.

Finally, the source to drain capacitance of each of the non-turning on FETs is nonlinear with voltage. The maximum capacitance of the non turning on FET occurs at the first instance of turnon of the FET which is being turned on. This gives rise to a maximum current. That maximum current is in the large physical loop described above and therefore helps to contribute to the generation of the substantial spurious radio frequency signals. Thus, in a high power converter using the prior art series half bridge configuration a number of factors all contribute to the generation of the undesirable spurious signals.

Figure 3:
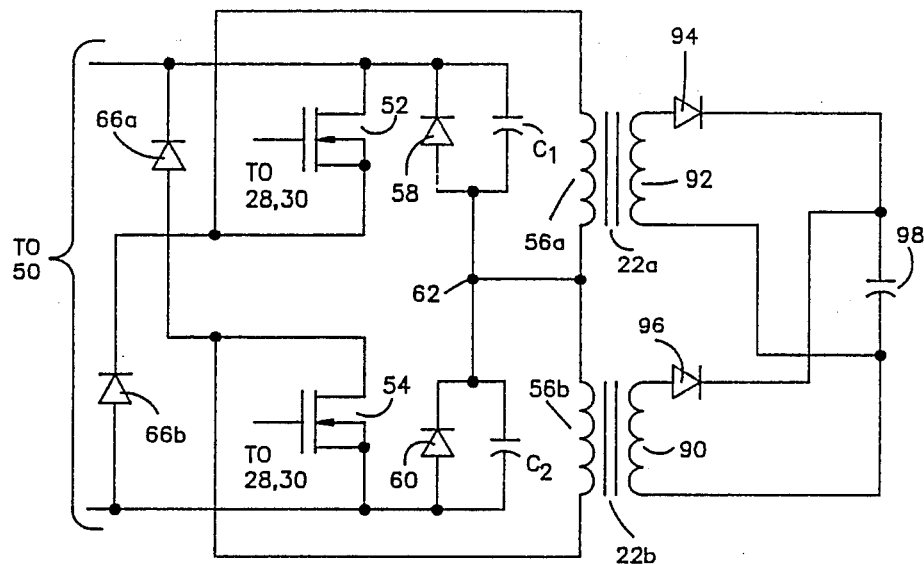
FIG. 3 is a schematic-block diagram illustration of a resonant converter and power transformers therefor illustrating one embodiment of the invention herein.

Referring now to FIG. 3 there is shown an arrangement for the FETs and power transformer, i.e., circuit 20 of FIG. 1, for use in a high power converter which overcomes the spurious signal generation problem described above. This arrangement uses two power transformers. One of the transformers 22a is associated with a FET 52 and the other transformer 22b is associated with a FET 54. Transformer 22a has a primary winding 56a and a secondary winding 92 and transformer 22b has a primary winding 22b and a secondary winding 90. High power converter circuit 20 also includes diodes 66a and 66b connected as shown. These diodes, as is well known in the art, clamp any voltage spikes which may occur on FETs 52 and 54 to the relatively constant voltage available from unregulated voltage source 50.

It should be appreciated while FETs 52 and 54 are shown as single devices they are, as described above, each a multiplicity of paralleled devices. A single device has been shown for ease of illustration. For ease of description they will be referred to hereinafter as if they are single FETs. The arrangement of FETs and transformers shown in FIG. 3 will be referred to hereinafter as the decoupled series half bridge configuration.

In the decoupled series half bridge configuration the drain to source capacitance of the off FET is no longer interconnected with the FET which is undergoing turn-on. The large physical loop described above has been eliminated. Each FET forms only the relatively small physical loop with its own drain to source capacitance.

In the decoupled series half bridge configuration the charge in the source to drain capacitance of the non-turning on FET is not moved through the turning on FET. That charge is moved through the associated winding 56a, 56b of the power transformer 22a, 22b, in reaction to energy stored in the shown inductance of power transformers 22a, 22b. As the transformer is essentially an inductive impedance, some or all of that charge is recoverable and therefor the efficiency of the high power converter increases. In addition, the turning on FET is decoupled from the nonlinear source to drain capacitance of the nonturning on FET. Thus, the decoupled series half bridge configuration minimizes the generation of the interfering spurious radio frequency signals inherent to the series half bridge configuration of FIG. 2 when supply 10 is required to provide high output power.

It should also be appreciated that while the decoupled series half bridge configuration of the present invention has been described in connection with a series resonant converter that the problem solved by that configuration arises because of the use of high power FETs. Therefore such a configuration is also useful for high power FETs used in a series half bridge arrangement in any other type of supply, as for example one which uses pulse width modulation to turn the FETs on and off.

As described in connection with FIG. 2, the control circuit 28 for supply 10 has as one input a relatively low amplitude sample of the resonant current flowing in the resonant circuit 20. The circuit 28 determines whether or not that current is zero and uses the going to zero of that current to turn off the on FET. Therefore, it is not only necessary to supply a sample of the resonant current to control circuit 28, but also to retain in that sample the information relating to the going to zero of the current.

Obtaining that sample is a relatively simple matter in a supply 10 which is designed to provide a moderate output power. In those supplies a single current transformer having a relatively moderate turns ratio is used to sample the resonant current. The turns ratio is moderate as the current being sampled may be only in the order of 30 to 60 amps.

In a high power converter the current being sampled may be in the order of 150 to 300 amps. A single current transformer may then require a substantial number of turns in order to reduce the current being sampled to an amplitude in the order of several hundreds of milliamperes. It is quite unwieldy to design a single current transformer having the required number of turns for use in a high current, high power circuit. Large numbers of turns tend to create multiple parasitic self resonant circuits which when excited by the signal current cause ringing on the output waveform.

Figure 4:
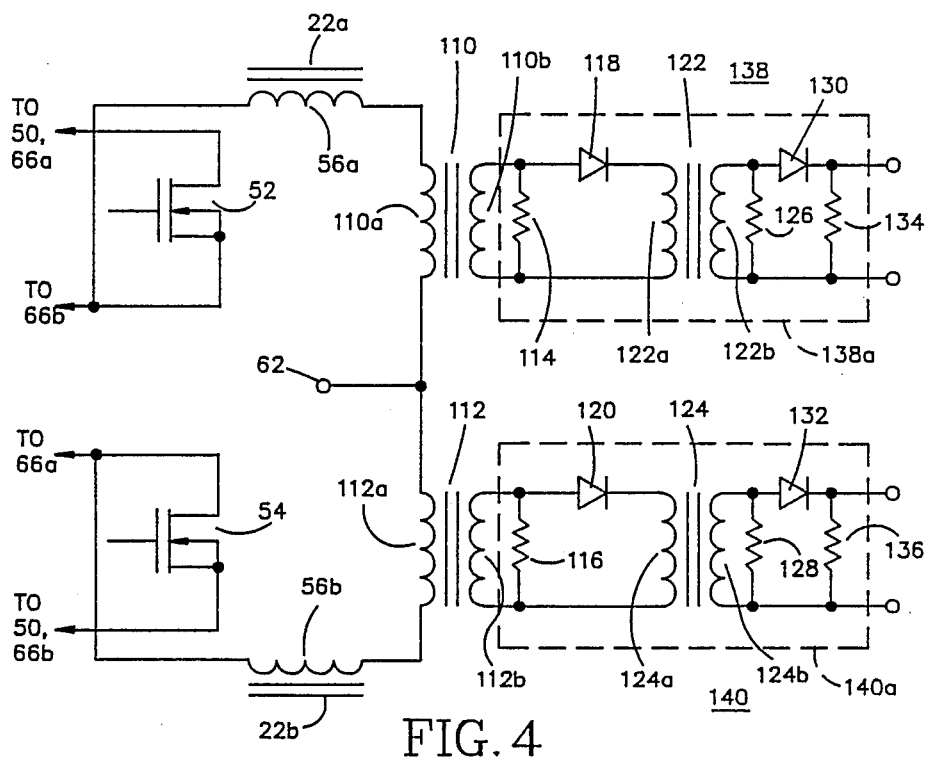
FIG. 4 is a schematic-block illustration of a portion of the embodiment shown in FIG. 3 and further showing an embodiment for the current transformers and associated circuitry used therewith.

Referring now to FIG. 4, there is shown part of the circuit FIG. 3 as well as the circuitry for the cascaded current transformers of the present invention. For ease of illustration only that part of the circuitry shown in FIG. 3 which is necessary for a description of the present invention has been shown in FIG. 4.

As the high power converter uses a decoupled half bridge power transformer configuration, i.e. two power transformers, it must therefore have two current sensing circuits 138 and 140 each associated with a respective one of the power transformers in order to properly sense the resonant current. Each of circuits 138 and 140 are identical in structure. They each comprise two cascaded current sensing transformers (110, 122 for circuit 138 and 112, 124 for circuit 140) and associated circuitry for resetting the transformers. The prior art series half bridge configuration shown in FIG. 2 need only have a single current sensing transformer.

The transformer 110 has its primary winding 110a connected in series with the primary winding 56a of power transformer 22a whereas the transformer 112 has its primary winding 112a connected in series with the primary winding 56b of power transformer 22b. The secondary windings 110b and 112b of transformers 110, 112 are each connected to identical circuits 138a and 140a.

Connected in parallel with the secondary winding 110b (112b) is a resistor 114 (116). A diode 118 (120) is connected as shown to one junction of transformer winding 110b (112b) and resistor 114 (116). The transformer is of the self resetting type and sets as the resonant current flows through its windings. The combination of resistor 114 (116) and associated diode 118 (120) allows for an orderly resetting of transformer 110 (112). The resistor 114 (116) is selected to have a resistance such that it presents a relatively light load to transformer 110 (112).

The cathode of diode 118 (120) and the other junction of transformer 110 (112) and resistor 114 (116) is connected to the primary winding 122a (124a) of current transformer 122 (124). A resistor 126 (128) is connected in parallel with the secondary winding 122b (124b) of transformer 122 (124). The resistor 126 (128) is selected to have a resistance such that it presents a relatively light load to transformer 122 (124). One junction of transformer 122 (124) and resistor 126 (128) is connected directly to one end of resistor 134 (136) whereas the other junction of the transformer and resistor is connected to the other end of resistor 134 (136) by a diode 130 (132), poled as shown. Resistor 134 (136) is selected to have a resistance such that it presents a relatively heavy load to transformer 122 (124).

In a circuit constructed in accordance with the present invention, transformer 110 (112) was designed to have a turns ratio of 1:30 and transformer 122 (124) was designed to have a turns ratio of 1:8. The overall turns ratio of the combination of the two transformers was then 40. resistance of resistor 114 (116) was selected to be 10 ohms while the resistance of resistor 126 (128) was selected to be 1000 ohms. I have found that the circuit of the present invention not only provides the desired relatively low amplitude sample of the resonant current for use in the control circuit 28 but also preserves in that sample the needed information relating to the going to zero of that current. While those in the art might be tempted to eliminate resistor 114 (116) and diode 118 (120) and connect the secondary winding 110b (112b) directly to primary winding 122a (124a), I have found that such a connection results in the loss of the needed going to zero information. Therefore, those circuit elements not only preserve that needed information but also provide for an orderly resetting of transformer 110 (112).

It is to be understood that the description of the preferred embodiments is intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. In a series resonant power supply of the type which includes a series resonant circuit which generates a resonant current signal, each half cycle of which goes to zero, said signal having a certain waveshape and amplitude and d-c level, a circuit for providing at its output a current signal which is substantially identical in all respects to said resonant current signal except for being reduced in amplitude and d-c level therefrom by a predetermined amount, said circuit comprising:
    (a) a first current sensing transformer having a first turns ratio, primary and secondary windings, said resonant current signal flowing through said primary winding to produce in said secondary winding a first resonant current signal which is substantially identical in waveshape to said resonant current signal except for having an amplitude and d-c level which are both reduced therefrom by said turns ratio;
    (b) a second current sensing transformer having a second turns ratio and primary and secondary windings;
    (c) first circuit means connected between said first current sensing transformer secondary winding and said second current sensing transformer primary winding, said circuit means responsive to said first resonant current signal for resetting said first current sensing transformer to thereby provide to said second current sensing transformer primary winding a second resonant current signal which is substantially identical in all respects to said first resonant current signal, said second resonant current signal flowing through said second current sensing transformer primary winding to produce in said second transformer secondary winding a third resonant current signal which is substantially identical in waveshape to said second resonant current signal except for having an amplitude and a d-c level which are both reduced therefrom by said second turns ratio; and
    (d) second circuit means connected between said second current sensing transformer secondary winding and said circuit output, said circuit means responsive to said third resonant current signal for resetting said second current sensing transformer to thereby provide said output current signal.

2. The circuit of claim 1 wherein said first circuit means comprises:
    (i) a resistor connected in parallel with said first current transformer secondary winding; and
    (ii) a diode connected in series between said first current transformer secondary winding and said second current transformer primary winding.

3. The circuit of claim 1 wherein said second circuit means comprises:
    (i) a first resistor connected in parallel with said second current transformer secondary winding;
    (ii) a second resistor connected in parallel across said circuit output; and
    (iii) a diode connected in series between said second current transformer secondary winding and said second resistor.

4. The circuit of claim 2 wherein said second circuit means comprises:
    (i) a first resistor connected in parallel with said second current transformer secondary winding:
    (ii) a second resistor connected in parallel across said circuit output; and
    (iii) a diode connected in series between said second current transformer secondary winding and said second resistor.

5. The circuit of claim 4 wherein said first circuit means diode has its cathode connected to said second current transformer primary winding and said second circuit means diode has its cathode connected to said second resistor.

6. The circuit of claim 2 wherein said resistor is selected to have a resistance such that it presents a relatively light load to said first current sensing transformer.

7. The circuit of claim 3 wherein said first resistor is selected to have a resistance such that it presents a relatively light load to said second current sensing transformer and said second resistor is selected to have a resistance such that it presents a relatively heavy load to said second current sensing transformer.

8. A circuit for use in a controllable converter device for providing electrical current to a load from a power source, comprising;
    (a) first and second switch means;
    (b) first and second capacitor means;
    (c) first and second power transformer means;
    (d) a first series resonant circuit comprising said first switch means connected in series with the load by said first power transformer means and said first capacitor means;
    (e) a second series resonant circuit comprising said second switch means connected in series with the load by said second power transformer means and said second capacitor means;
    (f) control means for actuating said first and said second switch means on such that only one of said switch mean is on at any one time to thereby cause said first and second series resonant circuits to generate a resonant current signal having a certain waveshape, amplitude and d-c level; and
    (g) first and second resonant current sensing means, said first resonant current sensing means being associated with said first series resonant circuit and said second resonant current sensing means being associated with said second series resonant circuit, each of said first and second resonant current sensing means comprising:
        (i) a first current sensing transformer having a first turns ratio, primary and secondary windings, said resonant current signal flowing through said primary winding to produce in said secondary winding a first resonant current signal which is substantially identical in waveshape to said resonant current signal except for having an amplitude and d-c level which are both reduced therefrom by said turns ratio;
        (ii) a second current sensing transformer having a second turns ratio and primary and secondary windings;

(iii) first circuit means connected between said first current sensing transformer secondary winding and said second current sensing transformer primary winding, said circuit means responsive to said first resonant current signal for resetting said first current sensing transformer to thereby provide to said second current sensing transformer primary winding a second resonant current signal which is substantially identical in all respects to said first resonant current signal, said second resonant current signal flowing through said second current sensing transformer primary winding to produce in said second transformer secondary winding a third resonant current signal which is substantially identical in waveshape to said second resonant current signal except for having an amplitude and a d-c level which are both reduced therefrom by said second turns ratio; and (iv) second circuit means connected between said second current sensing transformer secondary winding and an output of said current sensing means, said circuit means responsive to said third resonant current signal for resetting said second current sensing transformer to thereby provide at said output a current signal which in all respects is substantially identical to said third resonant current signal.

9. The circuit of claim 8 wherein said first circuit means comprises:
 (i) a resistor connected in parallel with said first current transformer secondary winding; and
 (ii) a diode connected in series between said first current transformer secondary winding and said second current transformer primary winding.

10. The circuit of claim 8 wherein said second circuit means comprises:
 (i) a first resistor connected in parallel with said second current transformer secondary winding;
 (ii) a second resistor connected in parallel across said circuit output; and
 (iii) a diode connected in series between said second current transformer secondary winding and said second resistor.

11. The circuit of claim 9 wherein said second circuit means comprises:
 (i) a first resistor connected in parallel with said second current transformer secondary winding;
 (ii) a second resistor connected in parallel across said circuit output; and
 (iii) a diode connected in series between said second current transformer secondary winding and said second resistor.

12. The circuit of claim 11 wherein said first circuit means diode has its cathode connected to said second current transformer primary winding and said second circuit means diode has its cathode connected to said second resistor.

13. The circuit of claim 9 wherein said resistor is selected to have a resistance such that it presents a relatively light load to said first current sensing transformer.

14. The circuit of claim 10 wherein said first resistor is selected to have a resistance such that it presents a relatively light load to said second current sensing transformer and said second resistor is selected to have a resistance such that it presents a relatively heavy load to said second current sensing transformer.

* * * * *